United States Patent
Lin et al.

(10) Patent No.: US 9,031,693 B2
(45) Date of Patent: May 12, 2015

(54) CLEANING ROBOT AND SYSTEM UTILIZING THE SAME

(71) Applicant: MSI Computer (Shenzhen) Co., Ltd., Shenzhen, Guangdong Province (CN)

(72) Inventors: Yi-Feng Lin, New Taipei (TW); Hung-Chou Chen, New Taipei (TW); Shih-Che Hung, Hsinchu (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 120 days.

(21) Appl. No.: 13/796,500

(22) Filed: Mar. 12, 2013

(65) Prior Publication Data

US 2014/0195050 A1      Jul. 10, 2014

(30) Foreign Application Priority Data

Jan. 5, 2013  (CN) .......................... 2013 1 0006724

(51) Int. Cl.
*G05D 1/02*      (2006.01)
(52) U.S. Cl.
CPC .............. *G05D 1/021* (2013.01); *G05D 1/0234* (2013.01); *Y10S 901/01* (2013.01); *Y10S 901/09* (2013.01); *G05D 2201/0203* (2013.01)
(58) Field of Classification Search
CPC ... G05D 2201/0215; G11B 7/135; G01S 1/70

USPC ........ 700/253, 245, 218; 318/568.11, 568.12, 318/568.2; 320/109
See application file for complete search history.

(56) References Cited

U.S. PATENT DOCUMENTS

| | | | | |
|---|---|---|---|---|
| 7,133,746 | B2 * | 11/2006 | Abramson et al. | 700/259 |
| 7,332,890 | B2 * | 2/2008 | Cohen et al. | 320/109 |
| 8,680,816 | B2 * | 3/2014 | Li | 320/137 |
| 8,688,270 | B2 * | 4/2014 | Roy et al. | 700/245 |

* cited by examiner

*Primary Examiner* — Dalena Tran
(74) *Attorney, Agent, or Firm* — Birch, Stewart, Kolasch & Birch, LLP

(57) ABSTRACT

A cleaning robot is disclosed. A first sensing unit generates a sensing signal to a transmittal line according to an external wireless signal. When the external wireless signal is sensed by the first sensing unit, a state of the transmittal line does not match with a pre-determined state. When the external wireless signal is not sensed by the first sensing unit, the state of the transmittal line matches with the pre-determined state. A control unit generates a movement signal when the state of the transmittal line matches with the pre-determined state. A plurality of wheels rotate according to the movement signal. A second sensing unit generates a second sensing signal according to the external environment of the cleaning robot. When the state of the transmittal line does not match with the pre-determined state, the control unit adjusts the movement signal according to the second sensing signal.

20 Claims, 3 Drawing Sheets

US 9,031,693 B2

CLEANING ROBOT AND SYSTEM UTILIZING THE SAME

CROSS REFERENCE TO RELATED APPLICATIONS

This application claims priority of China Patent Application No. 201310006724.2, filed on Jan. 5, 2013, the entirety of which is incorporated by reference herein.

BACKGROUND OF THE INVENTION

1. Field of the Invention

The invention relates to a robot, and more particularly to a robot with a cleaning function.

2. Description of the Related Art

Cleaning floors take a lot of time. To reduce the time for cleaning a floor, many cleaning devices have been developed, such as a broom, a mop and so forth. However, the cleaning devices must be manually operated for cleaning. Thus, conventional cleaning devices are inconvenient.

With technological development, many electronic devices have been developed, such as robots. Take a cleaning robot as an example, the cleaning robot can autonomously execute a cleaning action. A user is not required to manually operate the cleaning robot to clean a floor. Thus, the cleaning robot has gradually replaced conventional cleaning devices.

BRIEF SUMMARY OF THE INVENTION

An exemplary embodiment of a cleaning robot comprises a first sensing unit, a signal generating unit, a control unit, a plurality of wheels and a second sensing unit. The first sensing unit generates a sensing signal and provides the sensing signal to a transmittal line according to an external wireless signal. When the external wireless signal is sensed by the first sensing unit, a state of the transmittal line does not match with a pre-determined state. When the external wireless signal is not sensed by the first sensing unit, the state of the transmittal line matches with the pre-determined state. The signal generating unit makes the transmittal line match with the pre-determined state when the external wireless signal is not sensed by the first sensing unit. The control unit generates a movement signal when the state of the transmittal line matches with the pre-determined state. The wheels rotate according to the movement signal. The second sensing unit generates a second sensing signal according to an external environment. When the state of the transmittal line does not match with the pre-determined state, the control unit adjusts the movement signal according to the second sensing signal.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
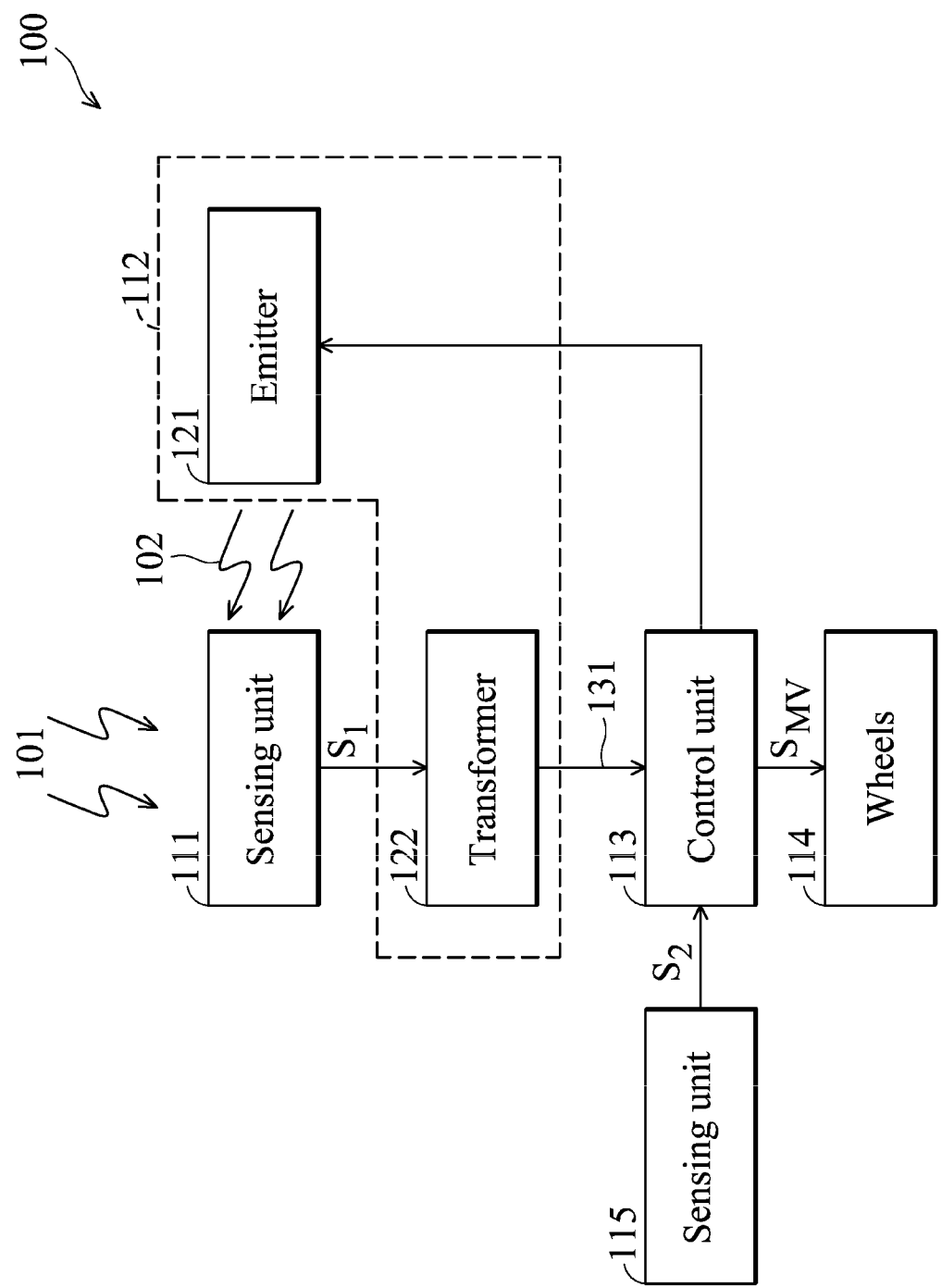
FIG. 1 is a schematic diagram of an exemplary embodiment of a cleaning robot.

FIG. 1 is a schematic diagram of an exemplary embodiment of a cleaning robot. The cleaning robot 100 comprises sensing units 111, 115, a signal generating unit 112, a control unit 113 and a plurality of wheels 114. The sensing unit 111 generates a sensing signal $S_1$ to a transmittal line 131 according to an external wireless signal 101. The invention does not limit the kind of the sensing unit 111. In one embodiment, the kind of the sensing unit 111 is determined according to the type of the external wireless signal 101. In this embodiment, the sensing unit 111 is a photo sensor. In another embodiment, the sensing unit 111 is an omni-directional sensor. In other embodiments, the sensing unit 111 is a sensor with a signal transformation function. For example, the sensor transforms a photo signal into an electronic signal, an audio signal into an electronic signal or a magnetic signal, a pressure signal, a heat signal, or a temperature signal into an electronic signal.

The signal generating unit 112 comprises an emitter 121 and a transformer 122. The emitter 121 emits a reference signal 102. The invention does not limit the type of the reference signal 102. In this embodiment, the type of the reference signal 102 is the same as the type of the external wireless signal. In one embodiment, the reference signal 102 is an invisible beam, such as an infrared ray. In other embodiments, the reference signal 102 is a visible beam, an audio signal or other signals, such as a magnetic signal, a pressure signal, a heat signal, or a temperature signal.

The transformer 122 transforms the sensing signal $S_1$ and provides the transformed signal to the control unit 113 via the transmittal line 131. In one embodiment, the transformer 122 is a photo-electronic transformer. In another embodiment, the transformer 122 is omitted if the control unit 113 is capable of processing the sensing signal $S_1$. In other embodiments, the transformer 122 is integrated with the control unit 113.

Since the emitter 121 continuously emits the fixed reference signal 102 to the sensing unit 111, when the external wireless signal 101 is not sensed by the sensing unit 111, the sensing unit 111 generates the sensing signal $S_1$ according to the reference signal 102. At this time, the state of the sensing signal $S_1$ should match with a first pre-determined state. In one embodiment, a level state or a frequency state of the sensing signal $S_1$ matches with the first pre-determined state.

After transforming the sensing signal $S_1$, the state of the transmittal line 131 should match with a second pre-determined state. For example, a level state or a frequency state of the state of the transmittal line 131 matches with a second pre-determined state. The control unit 113 generates a movement signal $S_{MV}$ according to the state of the transmittal line 131. In other embodiments, when the transformer 122 is omitted, the control unit 113 generates a movement signal $S_{MV}$ according to the state of the sensing signal $S_1$.

Next, when the external wireless signal 101 is sensed by the sensing unit 111, the original sensing signal $S_1$ is interfered with by the external wireless signal 101. The signal, which is interfered with by the external wireless signal 101, is referred to as a sensing signal $S_2$. At this time, the state of the sensing signal $S_1$ does not match with the first pre-determined state and the state of the transmittal line 131 does not match with the second pre-determined state. At this time, the control unit 113 adjusts the movement signal $S_{MV}$ according to the sensing signal $S_2$ generated by the sensing unit 115.

The wheels 114 rotate according to the movement signal $S_{MV}$. In one embodiment, when the state of the transmittal line 131 matches with the second pre-determined state, the wheels 114 rotate according to an original traveling path, such as a random traveling path, a clockwise traveling path, a counter-clockwise traveling path, or a wall following traveling path. When the state of the transmittal line 131 does not match with the second pre-determined state, it represents that the sensing unit 111 senses the external wireless signal 101. Thus, the control unit 113 controls the rotation direction of the wheels 114 according to the sensing signal $S_2$. In one embodiment, the wheels 114 rotate such that the cleaning robot 100 leaves or approaches to the external wireless signal 101. In another embodiment, the wheels 114 rotate along the external wireless signal 101.

The sensing unit 115 generates the sensing signal $S_2$ according to the external environment of the cleaning robot 100 or an internal state of the cleaning robot 100. The invention does not limit the kind of the sensing unit 115. In this embodiment, the sensing unit 115 comprises a plurality of sensors. In this case, the control unit 113 generates the movement signal $S_{MV}$ according to the priorities of the sensors. The priorities of the sensors are set beforehand.

In one embodiment, the sensing unit 115 comprises at least one of an audio sensor, a temperature sensor, a shock sensor, a collision sensor, an ultrasonic sensor, an infrared ray sensor or a visible beam sensor to sense the external environment of the cleaning robot 100. In another embodiment, the sensing unit 115 further comprises at least one of an air pressure sensor, a pressure sensor, a rotating sensor, a voltage sensor or an air flow sensor to sense the internal state of the cleaning robot 100.

For example, the cleaning robot 100 comprises a rechargeable battery (not shown). The rechargeable battery stores a voltage. When the voltage of the rechargeable battery is less than a pre-determined value, the sensing unit 115 makes the control unit 113 inactivate the signal generating unit 112. Thus, the signal generating unit 112 stops influencing the state of the transmittal line 131 such that the state of the transmittal line 131 may not match with a pre-determined state. At this time, the control unit 113 adjusts the movement signal $S_{MV}$ to find a wireless signal emitted by a docking station according to the sensing signal $S_1$.

In one embodiment, when the state of the transmittal line 131 matches with a second pre-determined state, or the sensing unit 111 does not sense the external wireless signal 101, the control unit 113 generates a movement signal $S_{MV}$ to the wheels 114 such that the wheels 114 rotate according to an original traveling path. Then, the control unit 113 adjusts the movement signal $S_{MV}$ according to the sensing signal $S_2$.

The invention does not limit the circuit structure of the control unit 113. In one embodiment, the control unit 113 is constituted by a combination of various hardware elements, such as controllers, micro-processors, memories and logic circuits.

Figure 2:
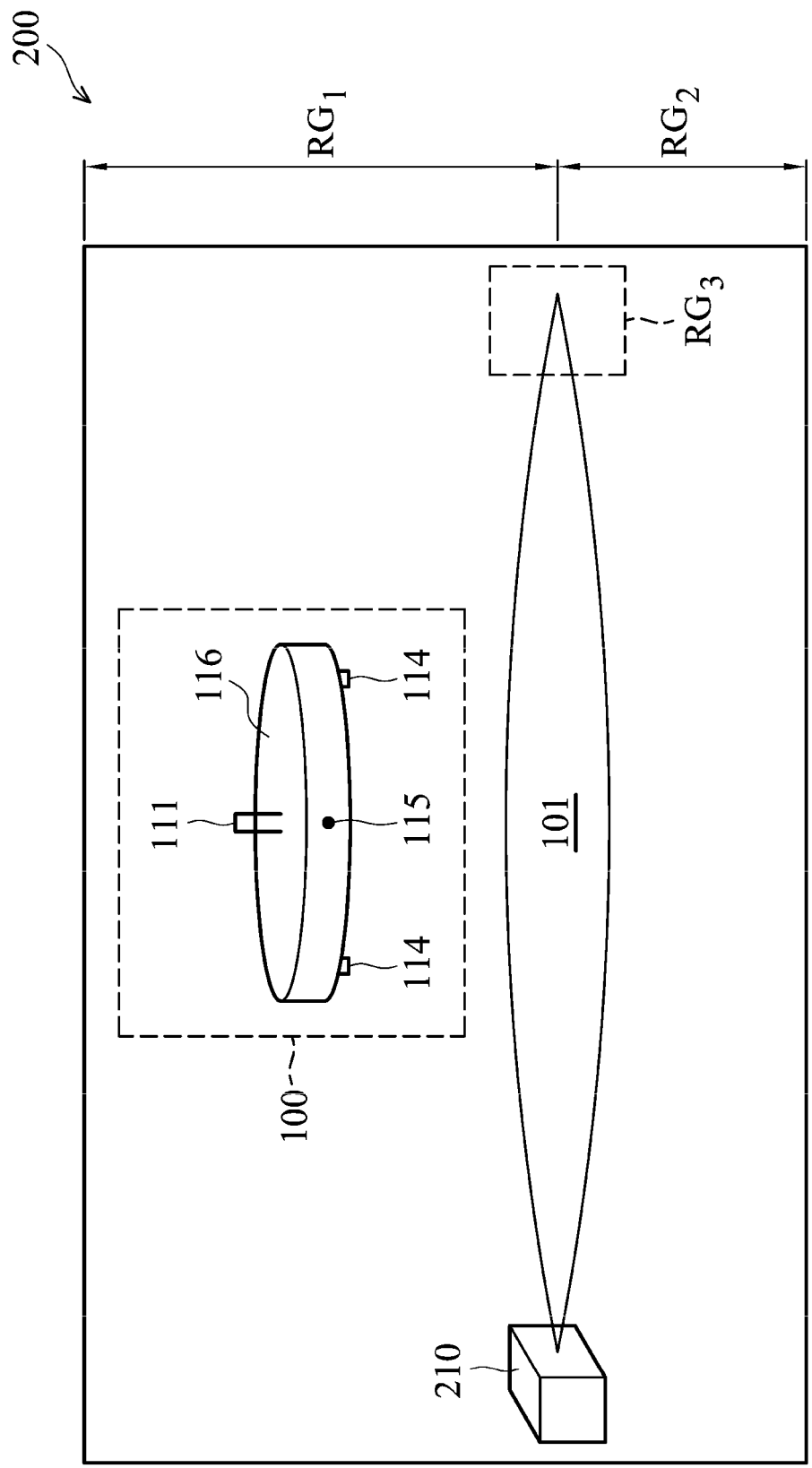
FIG. 2 is a schematic diagram of an exemplary embodiment of a cleaning system.

FIG. 2 is a schematic diagram of an exemplary embodiment of a cleaning system. The cleaning system 200 comprises a cleaning robot 100 and a wireless emitter 210. The cleaning robot 100 operates according to an external wireless signal 101 emitted by the wireless emitter 210. The invention does not limit the type of the external wireless signal 101. In one embodiment, the external wireless signal 101 is a photo signal, such as an invisible beam, a visible beam, an electronic signal or an audio signal.

In this embodiment, when the sensing unit 111 senses the external wireless signal 101, the traveling path of the cleaning robot 100 is determined by the sensing result of the sensing unit 115. In one embodiment, the control unit 113 generates a movement signal $S_{MV}$ to the wheels 114 according to the sensing signal $S_2$ generated by the sensing unit 115 such that the wheels 114 rotate along the external wireless signal 101 to leave or approach to the wireless emitter 210. In another embodiment, the cleaning robot 100 does not move through the region covered by the external wireless signal 101. In other words, the cleaning robot 100 only cleans in the region $RG_1$ and does not enter the region $RG_2$.

Furthermore, the invention does not limit the positions of the sensing units 111 and 115. In this embodiment, the cleaning robot 100 comprises a case 116. The case 116 comprises two openings. One opening is designed in a top surface of the case 116 and another opening is designed in a side surface of the case 116 to dispose the sensing units 111 and 115 therein. The invention does not limit the disposed position of the signal generating unit 112. In this embodiment, the signal generating unit 112 is disposed within the case 116. In other embodiments, the top surface of the case has another opening (not shown) to dispose the emitter 121 of the signal generating unit 112 therein. In this case, the emitter 121 approaches to the sensing unit 111.

Refer to FIG. 1, when the conventional cleaning robot senses the external wireless signal 101, the conventional cleaning robot decodes the external wireless signal 101 and determines a traveling path according to the decoded result. However, the intensity of the external wireless signal 101 is a minimum value and the cover range of the external wireless signal 101 is also a minimum range in the region $RG_3$. Thus, when the conventional cleaning robot enters the region $RG_3$, the conventional cleaning robot does not immediately decode the external wireless signal 101 because the conventional cleaning robot cannot receive enough information. Since the convention cleaning robot cannot immediately sense the external wireless signal 101, the cleaning robot will move through the region $RG_3$ and enter the region $RG_2$.

In this embodiment, when the sensing unit 111 does not sense the external wireless signal 101, the sensing unit 111 generates the sensing signal $S_1$ according to the reference signal 102. When the sensing unit 111 senses the external wireless signal 101, the sensing signal $S_1$ is interfered with by the external wireless signal 101. Thus, the state of the transmittal line 131 does not match with a second pre-determined state. At this time, the control unit 113 obtains the existence of the external wireless signal 101 according to the state of the transmittal line 131. Thus, the control unit 113 adjusts the movement signal $S_{MV}$ to prevent the cleaning robot from moving through the region covered by the external wireless signal 101.

In one embodiment, when the external wireless signal 101 is sensed by the sensing unit 111, the control unit 113 controls the rotation direction of the wheels 114 until the external wireless signal 101 is not sensed by the sensing unit 111. In another embodiment, when the external wireless signal 101 is sensed by the sensing unit 111, the cleaning robot slightly moves through the region covered by the external wireless signal 101 and then immediately turns around. In other embodiments, after the external wireless signal 101 is sensed, the cleaning robot immediately turns around.

For example, assume the external wireless signal 101 is a transient beam. When the cleaning robot 100 finds the external wireless signal 101 in the region $RG_1$, the cleaning robot 100 first moves through the region covered by the external wireless signal 101 to enter the region $RG_2$ and then comes back to region $RG_1$ to sense the external wireless signal 101 again. Since the external wireless signal 101 is a transient beam, when the cleaning robot 100 moves back to region $RG_1$, the cleaning robot 100 cannot sense the external wireless signal 101. Thus, the cleaning robot 100 moves from the region $RG_1$ to the region $RG_2$.

Additionally, when the external wireless signal 101 overlaps with another wireless signal (not shown), the conventional cleaning robot cannot decode the wireless signal in the covering region. Thus, the conventional cleaning robot cannot immediately execute a corresponding function, such as a ducking station detection. However, in this embodiment, when the cleaning robot 100 enters the covering region, the state of the transmittal line 131 is interfered with by the wireless signal in the covering region such that the state of the transmittal line 131 does not match with a pre-determined state. Thus, the control unit 113 determines that the cleaning robot 100 approaches to the external wireless signal 101 and adjusts the movement signal $S_{MV}$ according to the sensing signal $S_2$ generated by the sensing unit 115.

Figure 3:
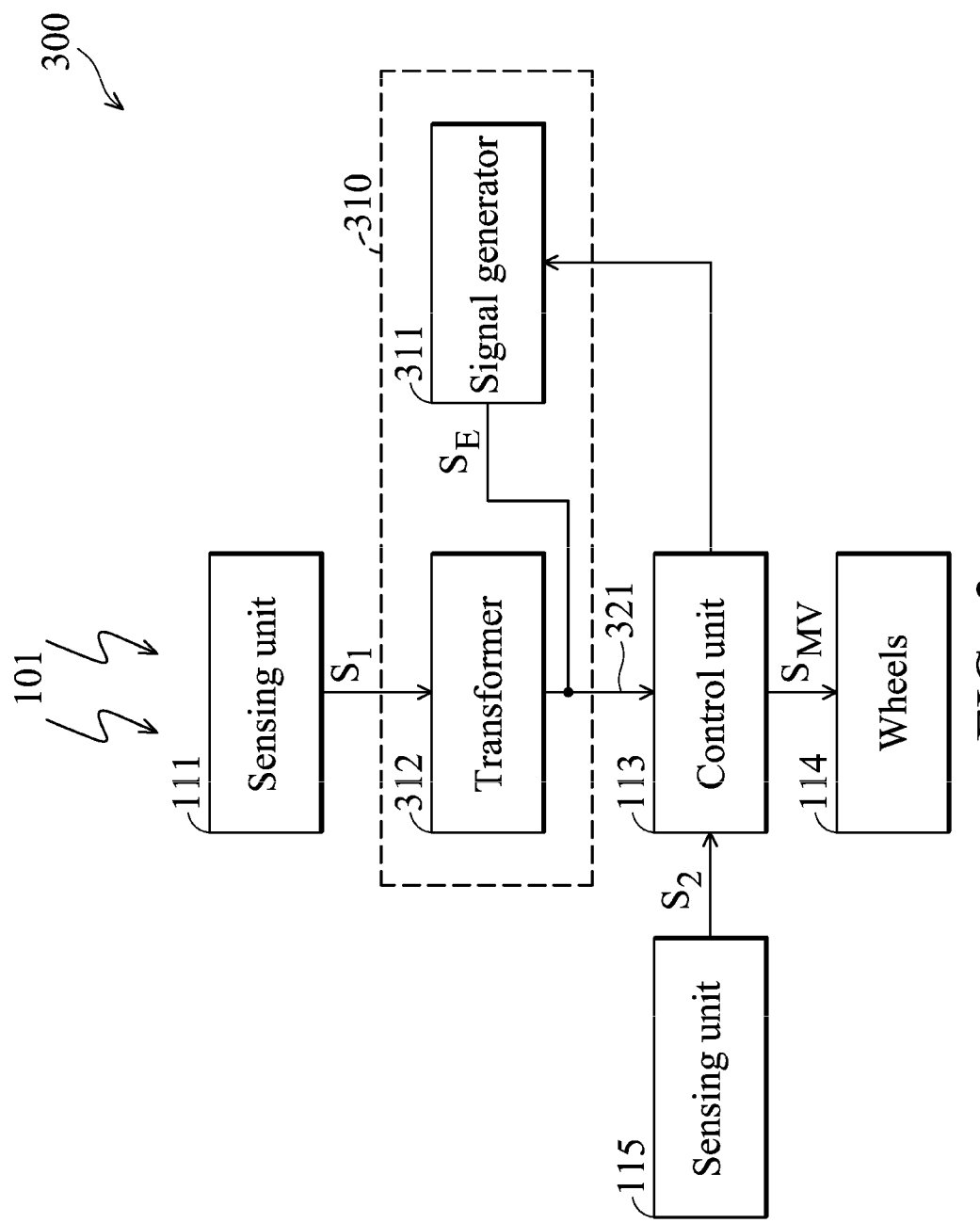
FIG. 3 is a schematic diagram of another exemplary embodiment of the cleaning robot.

FIG. 3 is a schematic diagram of another exemplary embodiment of the cleaning robot. FIG. 3 is similar to FIG. 1 except for the signal generating unit 310. In this embodiment, the signal generating unit 310 comprises a signal generator 311 and a transformer 312.

The transformer 312 transforms the sensing signal $S_1$ and provides the transformed signal to the control unit 113 via the transmittal line 321. The signal generator 311 generates an electronic signal $S_E$ and provides the electronic signal $S_E$ to the transmittal line 321. The invention does not limit the kind of the signal generator 311. In one embodiment, the signal generator 311 generates a fixed voltage or a fixed frequency to the transmittal line 321.

When the external wireless signal 101 is not sensed by the sensing unit 111, the state of the output terminal of the sensing unit 111 matches with a first pre-determined state. After the transformer 312 processes the state of the output terminal of the sensing unit 111, the state of the output terminal of the transformer 312 matches with a second pre-determined state. At this time, the control unit 113 makes the wheels 114 rotate according to an original direction. However, when the external wireless signal 101 is sensed by the sensing unit 111, the state of the transmittal line 321 does not match with a pre-determined state. Thus, the control unit 113 controls the rotation direction of the wheels according to the sensing signal $S_2$ generated by the sensing unit 115.

In other embodiments, the signal generator 311 generates another signal and provides the other signal to the output terminal of the sensing unit 111. When the external wireless signal 101 is not sensed by the sensing unit 111, the state of the output terminal of the sensing unit 111 matches with a first pre-determined state. After the transformer 312 processes the state of the output terminal of the sensing unit 111, the state of the output terminal of the transformer 312 matches with a second pre-determined state. In this case, the transformer 312 can be omitted or integrated in the sensing unit 111 or in the control unit 113. When the transformer 312 is omitted, the control unit 113 directly receives the output of the sensing unit 111.

When the external wireless signal 101 is sensed by the sensing unit 111, the state of the output terminal of the sensing unit 111 does not match with a first pre-determined state. After the transformer 312 processes the state of the output terminal of the sensing unit 111, the state of the output terminal of the transformer 312 does not match with a second pre-determined state. At this time, the control unit 113 controls the rotation direction according to the sensing signal $S_2$ generated by the sensing unit 115.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cleaning robot, comprising:
    an emitter emitting a reference signal;
    a first sensing unit generating a sensing signal to a transmittal line according to an external wireless signal and the reference signal, wherein when the external wireless signal is sensed by the first sensing unit, a state of the transmittal line does not match with a pre-determined state, and when the external wireless signal is not sensed by the first sensing unit, the state of the transmittal line matches with the pre-determined state;
    a signal generating unit making the transmittal line match with the pre-determined state when the first sensing unit does not sense the external wireless signal;
    a control unit generating a movement signal when the state of the transmittal line matches with the pre-determined state;
    a plurality of wheels rotating according to the movement signal; and
    a second sensing unit generating a second sensing signal according to the external environment of the cleaning robot, wherein when the state of the transmittal line does not match with the pre-determined state, the control unit adjusts the movement signal according to the second sensing signal,
    wherein the transmittal line is coupled between the first sensing unit and the control unit.

2. The cleaning robot as claimed in claim 1, wherein when the state of the transmittal line matches with the pre-determined state, the control unit adjusts the movement signal according to the second sensing signal.

3. The cleaning robot as claimed in claim 1, wherein when the state of the transmittal line does not match with the pre-determined state, the wheels leave the external wireless signal according to the movement signal.

4. The cleaning robot as claimed in claim 1, wherein when the state of the transmittal line does not match with the pre-determined state, the wheels rotate according to the movement signal such that the cleaning robot approaches to the external wireless signal.

5. The cleaning robot as claimed in claim 4, wherein the wheels rotate along the external wireless signal.

6. The cleaning robot as claimed in claim 1, further comprising:
    a rechargeable battery comprising a voltage, wherein when the voltage is less than a pre-determined value, the signal generating unit stops influencing the state of the transmittal line such that the state of the transmittal line does not match with the pre-determined state, and the control unit adjusts the movement signal according to the first sensing signal.

7. The cleaning robot as claimed in claim 1, further comprising:
    a case comprising a first opening to dispose the first sensing unit therein.

8. The cleaning robot as claimed in claim 7, wherein the first sensing unit is an omni-directional sensor.

9. The cleaning robot as claimed in claim 7, wherein the case further comprises a second opening to dispose the signal generating unit therein, and the signal generating unit is a luminescence device.

10. The cleaning robot as claimed in claim 7, wherein the signal generating unit is disposed within the case.

11. A cleaning system, comprising:
a wireless emitter generating an external wireless signal; and
a cleaning robot comprising:
an emitter emitting a reference signal;
a first sensing unit generating a sensing signal to a transmittal line according to an external wireless signal and the reference signal, wherein when the external wireless signal is sensed by the first sensing unit, a state of the transmittal line does not match with a pre-determined state, and when the external wireless signal is not sensed by the first sensing unit, the state of the transmittal line matches with the pre-determined state;
a signal generating unit making the transmittal line match with the pre-determined state when the first sensing unit does not sense the external wireless signal;
a control unit generating a movement signal when the state of the transmittal line matches with the pre-determined state;
a plurality of wheels rotating according to the movement signal; and
a second sensing unit generating a second sensing signal according to the external environment of the cleaning robot, wherein when the state of the transmittal line does not match with the pre-determined state, the control unit adjusts the movement signal according to the second sensing signal,
wherein the transmittal line is coupled between the first sensing unit and the control unit.

12. The cleaning system as claimed in claim 11, wherein when the state of the transmittal line matches with the pre-determined state, the control unit adjusts the movement signal according to the second sensing signal.

13. The cleaning system as claimed in claim 11, wherein when the state of the transmittal line does not match with the pre-determined state, the wheels leave the external wireless signal according to the movement signal.

14. The cleaning system as claimed in claim 11, wherein when the state of the transmittal line does not match with the pre-determined state, the wheels rotate according to the movement signal such that the cleaning robot approaches to the external wireless signal.

15. The cleaning system as claimed in claim 14, wherein the wheels rotate along the external wireless signal.

16. The cleaning system as claimed in claim 11, further comprising:
a rechargeable battery comprising a voltage, wherein when the voltage is less than a pre-determined value, the signal generating unit stops making the state of the transmittal line match with the pre-determined state and the control unit adjusts the movement signal according to the first sensing signal.

17. The cleaning system as claimed in claim 11, further comprising:
a case comprising a first opening to dispose the first sensing unit therein.

18. The cleaning system as claimed in claim 17, wherein the first sensing unit is an omni-directional sensor.

19. The cleaning system as claimed in claim 17, wherein the case further comprises a second opening to dispose the signal generating unit therein, and the signal generating unit is a luminescence device.

20. The cleaning system as claimed in claim 17, wherein the signal generating unit is disposed within the case.

* * * * *